United States Patent
Minamino et al.

(10) Patent No.: US 9,495,994 B2
(45) Date of Patent: Nov. 15, 2016

(54) OPTICAL DISC CAPABLE OF RECORDING ADDRESS INFORMATION WITH THE SAME MODULATION ON SIDES OF ADJACENT GROOVES

(71) Applicant: Panasonic Intellectual Property Management Co., Ltd., Osaka (JP)

(72) Inventors: Junichi Minamino, Nara (JP); Harumitsu Miyashita, Nara (JP); Kohei Nakata, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/984,179

(22) Filed: Dec. 30, 2015

(65) Prior Publication Data

US 2016/0111122 A1  Apr. 21, 2016

Related U.S. Application Data

(63) Continuation of application No. 14/641,936, filed on Mar. 9, 2015, which is a continuation of application No. PCT/JP2014/002803, filed on May 27, 2014.

(30) Foreign Application Priority Data

May 31, 2013 (JP) .................................. 2013-114995

(51) Int. Cl.
  *G11B 7/24* (2013.01)
  *G11B 7/007* (2006.01)
  (Continued)

(52) U.S. Cl.
  CPC .......... *G11B 7/00718* (2013.01); *G11B 7/007* (2013.01); *G11B 7/0053* (2013.01);
  (Continued)

(58) Field of Classification Search
  None
  See application file for complete search history.

(56) References Cited

U.S. PATENT DOCUMENTS

| 6,075,761 | A  | * | 6/2000 | Akiyama | ........... G11B 7/00736 |
| | | | | | 369/275.3 |
| 6,201,773 | B1 | * | 3/2001 | Aoki | .................... G11B 7/0037 |
| | | | | | 369/275.4 |

(Continued)

FOREIGN PATENT DOCUMENTS

| EP | 1 339 050 | 8/2003 |
| JP | 10-154332 | 6/1998 |

(Continued)

OTHER PUBLICATIONS

Computer Translation of JP 2005-243135, Pubn date Sep. 8, 2005.*

(Continued)

*Primary Examiner* — Tan X Dinh
(74) *Attorney, Agent, or Firm* — Wenderoth, Lind, Ponack, L.L.P.

(57) ABSTRACT

An optical disc medium includes a land and a groove at which information can be recorded. A predetermined number of address information units which record address information of the land or groove are provided in a circumferential direction of the optical disc medium. The address information unit of the land includes three or more address recording areas capable of recording address information. The address information is recorded on one area selected from among the three or more address recording areas. The address information unit of the land has address information which is recorded, in the same modulation, on the side of the inner adjacent groove and on the side of the outer adjacent groove. The one area to be selected from among the three or more address recording areas for recording the address information of the land is different among three address information units adjacently arranged in a radial direction.

5 Claims, 9 Drawing Sheets

(51) Int. Cl.
    *G11B 20/10*     (2006.01)
    *G11B 7/24082*     (2013.01)
    *G11B 20/12*     (2006.01)
    *G11B 27/30*     (2006.01)
    *G11B 7/005*     (2006.01)
    *G11B 7/24079*     (2013.01)
    *G11B 7/24085*     (2013.01)

(52) U.S. Cl.
    CPC ....... *G11B 7/00745* (2013.01); *G11B 7/24079* (2013.01); *G11B 7/24082* (2013.01); *G11B 20/10* (2013.01); *G11B 20/1217* (2013.01); *G11B 27/3027* (2013.01); *G11B 7/24085* (2013.01); *G11B 2007/00754* (2013.01)

(56) References Cited

U.S. PATENT DOCUMENTS

| | | | |
|---|---|---|---|
| 6,266,318 B1 | 7/2001 | Honda et al. | |
| 6,714,508 B1* | 3/2004 | Spruit | G11B 7/007 369/275.4 |
| 6,791,920 B1 | 9/2004 | Ko et al. | |
| 6,891,782 B1* | 5/2005 | Saito | G11B 7/0053 369/44.29 |
| 7,002,895 B1 | 2/2006 | Taussig | |
| 7,355,947 B2 | 4/2008 | Mashimo | |
| 7,817,529 B2* | 10/2010 | Yoon | G11B 7/0053 369/275.3 |
| 8,553,511 B2* | 10/2013 | Kobayashi | G11B 20/1217 369/53.35 |
| 2001/0019527 A1* | 9/2001 | Maeda | G11B 7/0053 369/111 |
| 2004/0027943 A1 | 2/2004 | Furumiya et al. | |
| 2004/0156291 A1* | 8/2004 | Heemskerk | G11B 20/1217 369/53.34 |
| 2004/0174792 A1 | 9/2004 | Miyamoto et al. | |
| 2004/0246863 A1 | 12/2004 | Ando | |
| 2004/0264324 A1 | 12/2004 | Mashimo | |
| 2004/0264326 A1 | 12/2004 | Mashimo | |
| 2005/0105425 A1 | 5/2005 | Ko | |
| 2005/0213481 A1 | 9/2005 | Ando | |
| 2006/0018230 A1 | 1/2006 | Mashimo | |
| 2006/0120263 A1* | 6/2006 | Kayanuma | G11B 7/0045 369/275.4 |
| 2013/0336097 A1* | 12/2013 | Ando | G11B 7/00718 369/30.03 |

FOREIGN PATENT DOCUMENTS

| | | |
|---|---|---|
| JP | 2000-163809 | 6/2000 |
| JP | 2000-298842 | 10/2000 |
| JP | 2001-143273 | 5/2001 |
| JP | 2004-265546 | 9/2004 |
| JP | 2005-38566 | 2/2005 |
| JP | 2005-243135 | 9/2005 |
| WO | 02/33699 | 4/2002 |

OTHER PUBLICATIONS

Computer Translation of JP 2000-163,809, Pubn date Jun. 16, 2000.*
International Search Report issued in International Application No. PCT/JP2014/002803 on Jul. 15, 2014.
Shigeru Furumiya, "Blu-ray Disc Gijutsu, Jisedai Hikari Disk Kaitai Shinsho", Nikkei Business Publications, Inc., Oct. 7, 2003, pp. 58-72 (with Partial English Translation).
Computer translation (partial) of JP 2005/0243135 (Sep. 8, 2005).
International Preliminary Report on Patentability issued Dec. 10, 2015 in International Application No. PCT/JP2014/002803 (English Translation).

* cited by examiner

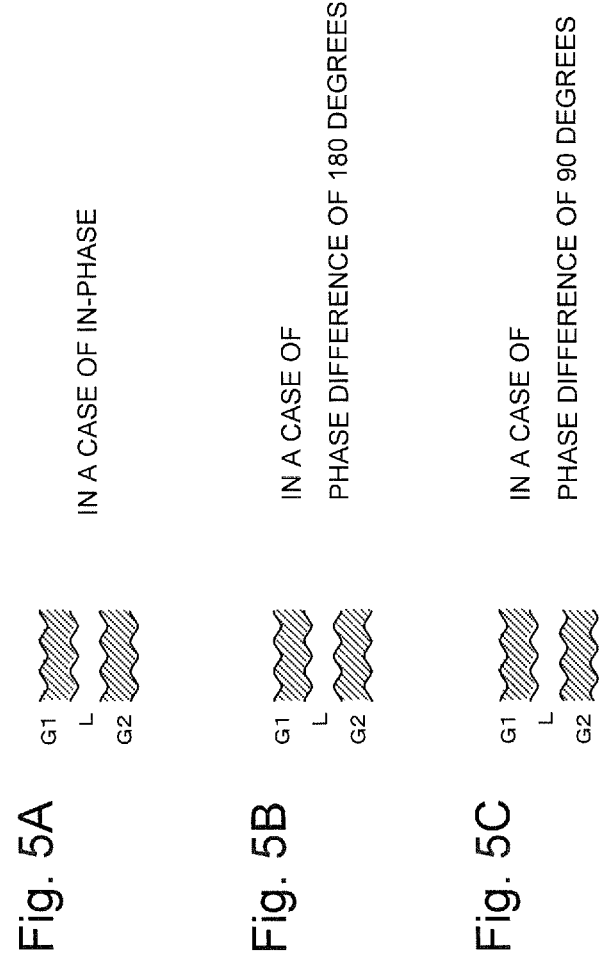

OPTICAL DISC CAPABLE OF RECORDING ADDRESS INFORMATION WITH THE SAME MODULATION ON SIDES OF ADJACENT GROOVES

BACKGROUND

1. Technical Field

As described above, according to the optical disc of the present embodiment, since the phase difference of the grooves on the both sides of the land is set to 90 degrees or less, the maximum variation of the track width of the land can be decreased to approximately 70% of the case of the optical disc having the phase difference of the adjacent wobbles which is 90 degrees.

2. Related Art

In a field of video technology, optical discs such as DVD, BD (Blu-ray (registered trademark) Disc), and the like are well-known. These optical discs are used as media for recording video data and also used as external storage media for personal computers. As external storage media for personal computers, hard disks, flash memories, and the like are also used. Compared with such media, the optical disc media have advantages of long-life, high reliability, and no power necessary for retaining data. In view of the advantages, the optical disc media attract attention as archive media for storing important data, which is managed by data centers and the like. However, even an optical disc BD-XL which is one of the optical discs having the largest storage capacity, has a storage capacity of 128 GB per one disc. Therefore, a number of optical discs are required to store significantly large amount of data, and thus, a large space for storing such optical discs is required. Accordingly, it is required to further increase recording density of optical disc media (for example, JP 2004-265546 A).

SUMMARY

In a conventional optical disc medium, address information indicating a physical location of storing information in the optical disc medium is recorded by pits or grooves. With the improvement of the recording density of optical disc medium, it is required to develop recording technology of address information which is adapted to the improvement of the recording density. In particular, recording technology of address information enables reduction of influence on recording of user data while ensuring reliability of detection of address information.

One non-limiting and exemplary embodiment provides an optical disc medium and an optical disc device which achieve high recording density, which ensure reliability of detection of address information, and which reduce influence on recording of user data.

In a first aspect, an optical disc medium is provided including a land and a groove at which information can be recorded. In the optical disc medium, a predetermined number of address information units which record address information of the land or groove are provided in a circumferential direction of the optical disc medium. The address information unit of the land includes three or more address recording areas capable of recording address information, the address information is recorded on one area selected from among the three or more address recording areas. The address information unit of the land has address information which is recorded, in the same modulation, on the side of the inner adjacent groove and on the side of the outer adjacent groove. The one area to be selected from among the three or more address recording areas for recording the address information of the land is different among three address information units adjacently arranged in a radial direction.

In a second aspect, an optical disc medium is provided including a land and a groove at which information can be recorded. In the optical disc medium, a predetermined number of address information units which record address information of the land or groove are provided in a circumferential direction of the optical disc medium. Wobbles are formed on the land or groove. The wobbles include a base wobble and an information wobble indicating a predetermined logical value. The address information unit records the address information with the information wobble in the wobbles on the land or groove. The information wobble has a waveform with a phase different from that of a waveform of the base wobble by approximately −90 or +90 degrees to represent "0" or "1". The waveform with a phase different by approximately −90 or +90 degrees is formed by a wobble with a frequency 1.25 or 0.75 times the frequency of the base wobble.

In a third aspect, an optical disc device is provided, that reproduces information from the aforementioned optical disc medium. The optical disc device includes: a signal generating unit configured to generate a signal in accordance with the wobbles formed on the land or groove; a phase-shifted waveform generating unit configured to generate a signal having a phase difference of 90 degrees with respect to the base wobble, from the signal generated by the signal generating unit; a phase detection unit configured to perform phase detection by using the signal generated by the signal generating unit and the signal generated by the phase-shifted waveform generating unit to generate an signal; an area determining unit configured to determine one area on which address information is recorded from (a plurality of (ex. the three or more) address recording areas, according to an absolute value of a signal generated by the phase detection unit; and an address detection unit configured to detect an address from the area determined by the area determining unit based on a detection result of the phase detection unit.

In a fourth aspect, a method of reproducing information from the aforementioned optical disc medium is provided. The method includes: generating a wobble signal in accordance with the wobbles formed on the land or groove; generating a signal having a phase difference of 90 degrees with respect to the base wobble, from the generated wobble signal; performing phase detection by using the wobble signal and the signal having the phase difference of 90 degrees to generate a signal; determining one area on which address information is recorded from a plurality of (ex. the three or more) address recording areas, according to an absolute value of a signal generated by the phase detection; and detecting an address from the determined area based on a result of the phase detection.

According to the present disclosure, variation of track width of the land or groove can be reduced. Therefore, an optical disc medium and an optical disc device can be provided, which can ensure reliability of detection of address information and reduce influence on recording of user data while achieving improvement in density.

BRIEF DESCRIPTION OF DRAWINGS

FIGS. 5A to 5C are drawings for describing variation of land track width with respect to phases of grooves on both sides of a land.

DETAILED DESCRIPTION

Figure 1:
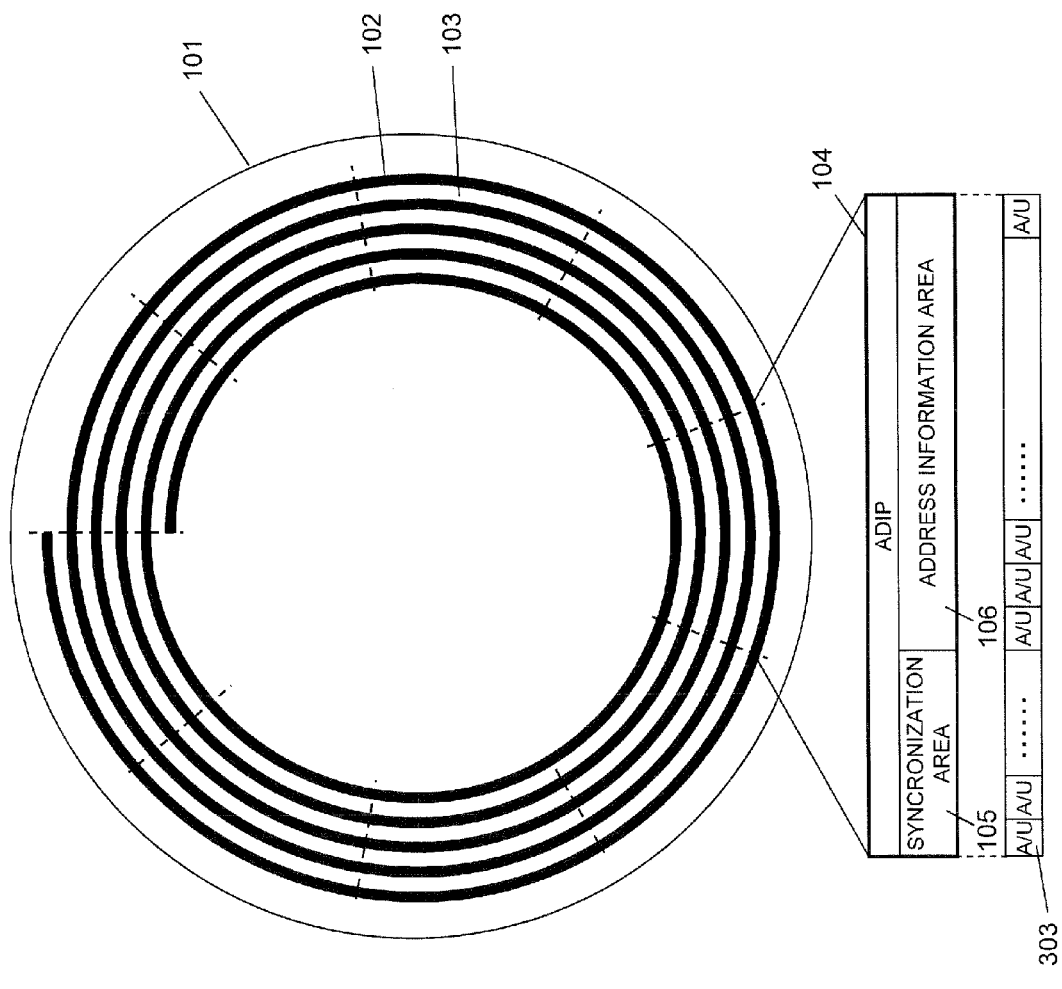
FIG. 1 is a schematic view of an optical disc medium according to an embodiment.

With reference to the drawings as required, embodiments are described in detail below. However, unnecessarily detailed description may be omitted. For example, detailed description of already well-known matters and repeated description of substantially the same configuration may be omitted. Such omissions are intended to prevent the following description from being construed unnecessarily redundant, thereby facilitating understanding by those skilled in the art.

The inventor(s) provide the accompanying drawings and the following description for those skilled in the art to help them to fully understand the present disclosure and do not intend to limit the subject described in the claims by the accompanying drawings and the following description.

Specific Problems to be Solved by Present Disclosure

An optical disc has a guide groove called "groove" provided for allowing precise control of the light spot to be positioned on a recording track. User data is recorded at the groove (guide groove). There is a technology of land-and-groove recording that ensures high recording density of optical medium. The land-and-groove recording is a technology for recording user data not only on a groove, but also on a so-called "land" formed between areas at which the groove is formed.

The optical disc is recorded a physical address (hereinafter referred to as "address") associated with its location for recognition of the location to/from which user data is recorded/reproduced. There is a method that uses pre-pits among plural methods for forming address information in the optical disc. Since user data cannot be recorded on a portion where the pre-pits are formed, the recording capacity decreases as the address information is provided more.

In addition, as another method for forming address information, there is a method that uses a meandering (hereinafter referred to as "wobble") of a track. An address recorded on a wobble is referred to as "wobble address". The method that uses wobbles permits detection of the wobble address by a method different from a method of reproducing user data, and thus the method that uses wobbles has an advantage that the recording capacity does not decrease.

As described above, on a groove, address information is recorded with pre-pit or wobble. However, for recording addresses on the land, the shape of a land cannot be directly controlled in a process of manufacturing an optical disc. Therefore, it is difficult to record address information on the land, and it may be necessary to record address information of the land by using the shape of the groove adjacent to the land.

As a method for recording address information of a land by using wobbles of a groove, the following technology can be considered. For example, in an optical disc, in order to dispose address information on a land, a first address information area and a second address information area are provided by unit of segment. One bit of address is recorded on either one of the first address information area and the second address information area. Specifically, a bit of "0" or "1" is recorded by forming wobbles of grooves on both sides of the land in the same phase or the opposite phase.

The first address information area and the second address information area are alternately used as an area which records an address, for every adjacent land track. Further, a selection signal is recorded, indicating which one of the first and second address information is effective (which one is to be used). Hence, it is possible to record address information of the land by the wobble of the groove track.

In the optical disc described above, the address of the groove is not disposed on an area of the groove adjacent to an area of the land on which the address of the land is disposed. However, the address of the groove is disposed on an area of the groove which is adjacent on the inner or outer circumferential side of the land to an area of the land on which the address of the land is not disposed.

When the adjacent grooves (namely, the groove on the outer circumferential side and the groove on the inner circumferential side) have the same shape, there is no problem. However, when they have different shapes from each other, there is a problem. Namely, the different shapes imply that phases of the two grooves on the outer circumferential side and on the inner circumferential side are opposite to each other. In this case, the track width of the land (namely, the distance between the grooves) varies in a large range, causing adverse effects on the recording and reproducing of user data.

Further, when detection of a selection signal indicating which information is effective between the first address information and the second address information fails, incorrect address information may be detected. This causes a reliability problem in address detection.

An embodiment of an optical disc medium and an optical disc device to solve the above-described problem is described below.

First Embodiment

Referring to the drawings, an optical disc medium and an optical disc device according to the present embodiment are described.

1. Optical Disc Medium

FIG. 1 is a drawing for describing configuration of tracks of an optical disc medium according to the present embodiment. As shown in FIG. 1, an optical disc 101 has a groove track (hereinafter referred to as "groove") 102 which is formed in a spiral shape. A land track (hereinafter referred to as "land") 103 is formed in a spiral shape at a region sandwiched by the groove 102 formed in the spiral shape. The optical disc 101 of the present embodiment can record user data (information) on both of the groove 102 and the land 103. That is, the groove 102 and the land 103 can be used as recording tracks.

The groove 102 and the land 103 are divided into a plurality of units at a predetermined angle (namely, at a predetermined range of a central angle) in the circumferential direction. Each unit of the divided groove 102 and the divided land 103 forms an address information unit (hereinafter referred to as "ADIP (ADress In Pre-Groove)") 104 which is a unit for recording a physical address. The ADIP 104 includes one piece of address information with respect to a unit area on the optical disc 101. The ADIP 104 includes a synchronization area 105 on a header part thereof and an address information area 106 subsequent to the synchronization area 105. This structure is repeated at the same central angle range, from the inner circumferential side to the outer circumferential side of the optical disc 101. Further, the ADIP 104 includes a plurality of ADIP units 303 (details will be described later).

Figure 2:
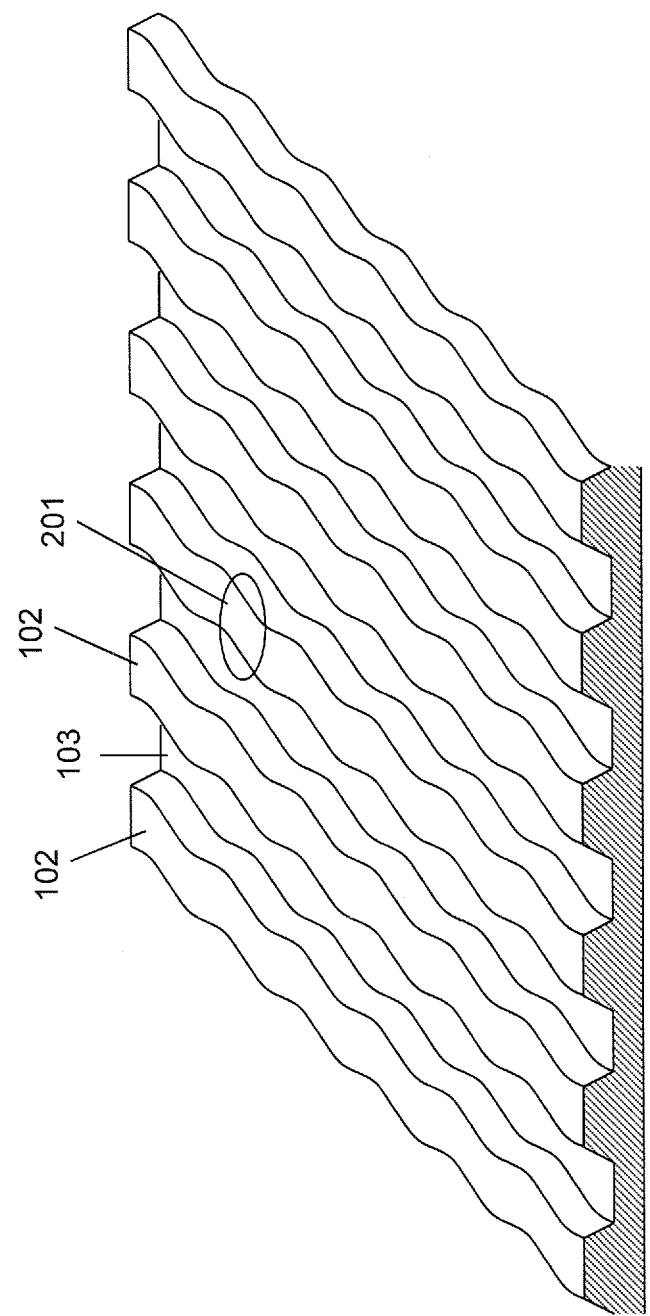
FIG. 2 is a perspective view of a recording surface of the optical disc medium according to the embodiment.

FIG. 2 is a drawing illustrating an enlarged view of a part of a recording surface of the optical disc 101. On manufacturing the disc, the groove 102 is formed by transcribing a groove portion of a stamper which is formed in a groove shape to the recording surface. The groove 102 is positioned on a side closer to a light source than the land 103. When the groove is formed on the stamper, a disc manufacturing device form the groove on the stamper with constant beam intensity, and thus the groove width is substantially constant. The groove 102 in the optical disc 101 which is formed by the transcription also has a substantially constant track width on the whole surface of the optical disc 101.

The land 103 is located at a region between the grooves 102. As shown in FIG. 2, the groove 102 and the land 103 in most part thereof are formed in a meandering shape with a constant period. This meandering is "a wobble". The wobble is formed to have a shorter period than a response speed when a light spot 201 tracks the groove 102 or the land 103. Therefore, variation in the relative position between the light spot 201 and the groove 102 or land 103 occurs, and such variation is optically detected and then converted into an electrical signal, thus enabling detection of the shape of the wobbles.

In the detection of wobbles, a clock synchronized with a detection signal is generated. This clock is used for detecting the physical length and the linear velocity of the optical disc 101. In addition, the clock may be used for reproduction of recorded sub-information by varying the wobble shape. The optical disc medium in this embodiment records address information with the wobbles.

In the groove 102, as described above, due to the constraints of the manufacture of discs, the track width is regulated at a constant width. However, the track width of the land 103 sandwiched by the groove 102 may vary due to the phases of the wobbles on the inner circumferential side groove adjacent to the land and on the outer circumferential side groove adjacent to the land.

1-1. Configuration of ADIP

Figure 3:
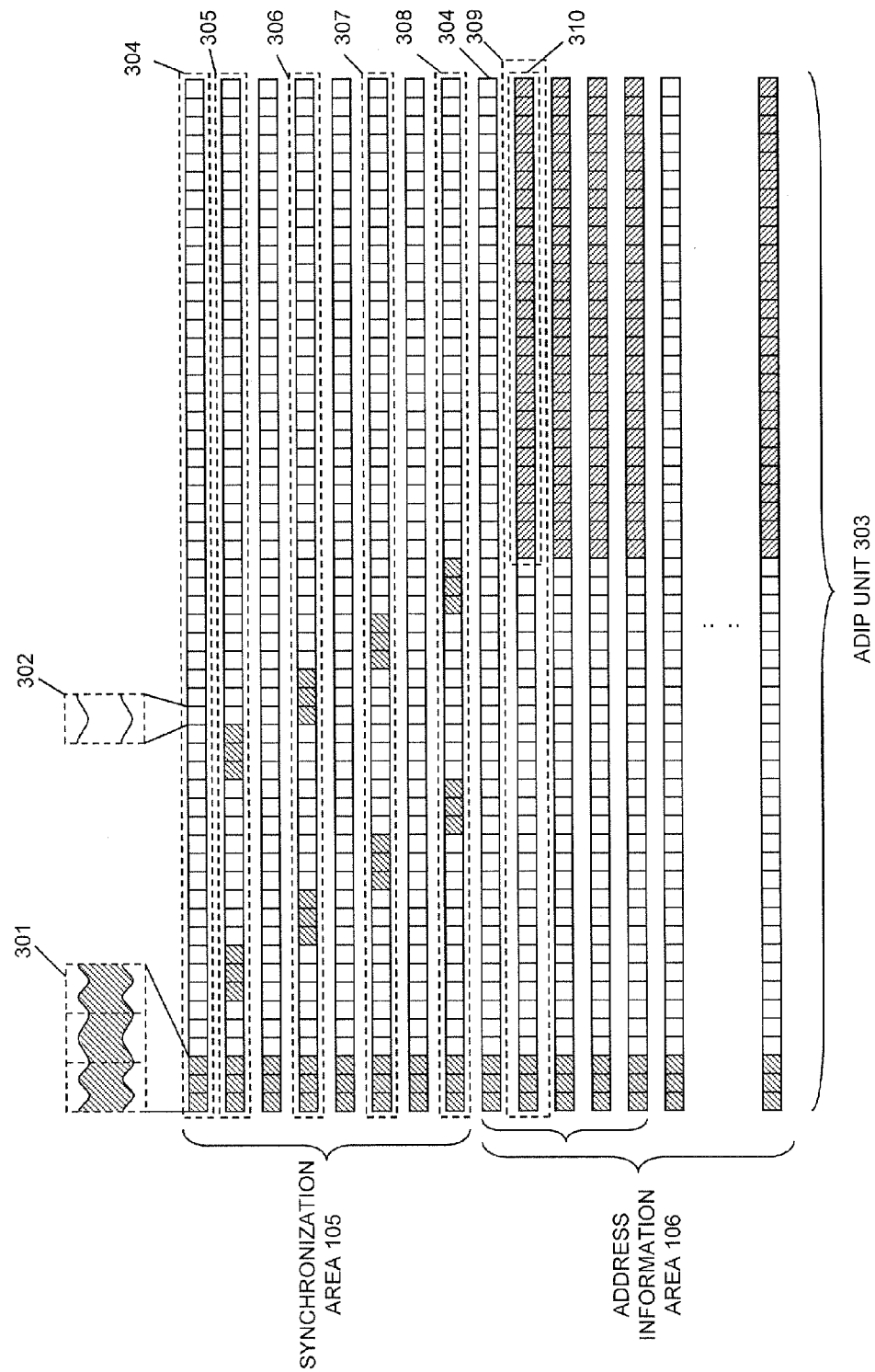
FIG. 3 is a drawing for describing configuration of an address information unit (ADIP) of the optical disc medium according to the embodiment.

Referring to FIG. 3, ADIP 104 is described in detail as follows. FIG. 3 is a drawing for describing configuration of the ADIP. As shown in FIG. 3, the ADIP 104 includes a predetermined number (for example, 83) of ADIP units 303. Originally, the ADIP units 303 are arranged continuously in the area of the ADIP 104 as shown in FIG. 1. However, for convenience of the description, in FIG. 3 the ADIP units 303 are shown so that the ADIP units 303 are separated into discrete ADIP units 303 and the discrete ADIP units are arranged in parallel. The most part of ADIP 104 are composed of base wobbles 302. A shape of the base wobble 302 corresponds to one period of waveform of $+\cos(\omega t)$. The base wobble 302 has a waveform which varies, within one period, from the maximum inward displacement, the maximum outward displacement, and to the inward maximum displacement.

Another part of the ADIP 104 other than the base wobbles are composed of wobbles each having the same periods as the one period of base wobble 302. Hereinafter, one period of the base wobble 302 is referred to as "a wobble period". The ADIP unit 303 has a length of fifty-six wobble periods.

In the first three wobble periods of the ADIP unit 303, a MSK (Minimum Shift Keying) mark 301 indicating a delimitation of the ADIP unit is disposed. The MSK mark 301 is formed of a wobble having one period of waveform of $+\cos(1.5\omega t)$, a wobble having one period of waveform of $-\cos(\omega t)$, and a wobble having one period of waveform of $-\cos(1.5\omega t)$, which are joined in this order. The secondarily disposed wobble in the MSK mark 301 represented by the waveform of $-\cos(\omega t)$ has a waveform of an inverted phase (180-degree shifted phase) with respect to the base wobble 302. Therefore, phase detection based on a signal synchronized with the base wobble 302 enables detection of the position of the MSK mark 301.

Among the ADIP units 303, there are a ADIP unit 303 included in a synchronization area 105 of the ADIP 104, and a ADIP unit 303 included in an address information area 106 of the ADIP 104. The ADIP units 303 have specific patterns corresponding to respective given functions in fifty-three wobble periods subsequent to the MSK mark 301.

Firstly, the ADIP units 303 included in the synchronization area 105 of the ADIP 104 are described as follows. In the synchronization area 105, a monotone ADIP unit 304, a first synchronization ADIP unit 305, a second synchronization ADIP unit 306, a third synchronization ADIP unit 307, and a fourth synchronization ADIP unit 308 are disposed.

The monotone ADIP unit 304 is composed of only base wobbles 302 except for the MSK mark disposed at the head of the ADIP unit. This configuration helps stable generation of the clock synchronized with the wobbles.

The first synchronization ADIP unit 305, the second synchronization ADIP unit 306, the third synchronization ADIP unit 307, and the fourth synchronization ADIP unit 308 are disposed for the purpose of recognizing the position in the ADIP 104. They are disposed on an area close to the header part of the ADIP 104. There is no other ADIP unit having the same pattern in the ADIP 104.

Next, the ADIP unit 303 included in the address information area 106 of the ADIP 104 is described below. In the address information area 106, monotone ADIP units 304 and address information ADIP units 309 are disposed.

The address information area 106 includes fifteen units of ADIP units, each unit including one monotone ADIP unit 304 and four address information ADIP units 309.

The address information ADIP unit 309 has one bit of information. The address information area 106 has sixty bits of information, since it includes seventy-five ADIP units as a whole (that is, it includes sixty address information ADIP units 309). An address information ADIP unit 309 records (stores) one bit on its address information wobble 310.

This sixty bits of information may include not only address information which is a physical positional information in the optical disc, but also sub-information such as layer information for a multilayer optical disc, information relating to a condition for recording on the optical disc, copyright information, and so on, as well as error-correction/error-detection code therefor.

The address information ADIP unit 309 includes a MSK mark 301, a base wobble 302, and an address information wobble 310. The address information ADIP unit 309 has the MSK mark 301 in the first three wobble periods. In addition, the address information ADIP unit 309 has the base wobbles 302 in subsequent twenty-seven wobble periods. Further, the address information ADIP unit 309 has an address information wobbles 310 in subsequent twenty-six wobble periods. The address information wobble 310 is formed based on address information, of which detail is described later.

Wobbles on an area other than area on which the address information wobbles 310 are similarly formed are disposed over the whole of the ADIP 104 of the optical disc 101. Further, as shown in FIG. 1, the ADIPs 104 are arranged on every circumferential area from the inner circumference to the outer circumference. For these two reasons, the wobble shapes of the wobbles other than the address information wobbles 310 are the same in the radial direction.

Further, a land which is sandwiched by the grooves having the same shape has also the same shape. Therefore, the MSK mark 301 formed on the header part of the ADIP unit, the first synchronization ADIP unit 305, the second synchronization ADIP unit 306, the third synchronization ADIP unit 307, and the fourth synchronization ADIP unit 308 on the land have the same shape as those on the groove, respectively. Namely, the land as well as the groove, is detectable.

1-1-1. Address Information Wobble

Figure 4A:
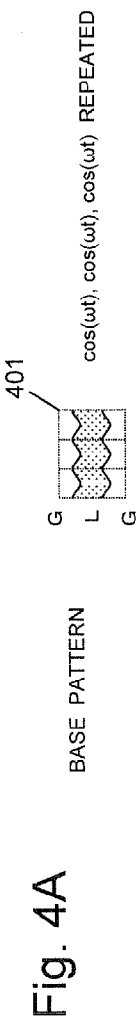
FIGS. 4A to 4D are drawings for describing wobble shapes having address information according to the embodiment.
Figure 4B:
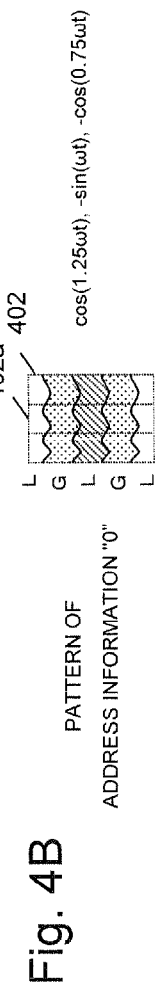
Figure 4C:
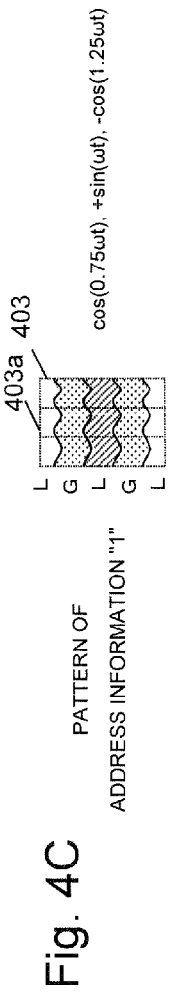

With reference to FIGS. 4A to 4D, the address information wobble 310 is described in detail as follows. FIG. 4A is a drawing illustrating a base pattern. FIG. 4B is a drawing illustrating a pattern of address information "0". FIG. 4C is a drawing illustrating a pattern of address information "1".

The base pattern 401 is formed to have a waveform $+\cos(\omega t)$ of the three periods of base wobbles. The pattern 402 of the address information "0" is formed to have a waveform $+\cos(1.25\omega t)$ of one period, a waveform $-\sin(\omega t)$ of one period, and a waveform $-\cos(0.75\omega t)$ of one period. The pattern 403 of the address information "1" is formed to have a waveform $+\cos(0.75\omega t)$ of one period, a waveform $+\sin(\omega t)$ of one period, and a waveform $-\cos(1.25\omega t)$ of one period. In the address information patters 402 and 403, a logic value is defined by the waveforms of the second wobbles (hereinafter referred to as "information wobble") 402a and 403a, respectively. Therefore, the waveforms of the second wobbles (information wobbles) 402a and 403a in the address information patterns 402 and 403 allow the logical values of "0" and "1" to be recognized, respectively. The first and third waveforms are provided by taking into consideration continuous connection to other waveforms.

Figure 4D:
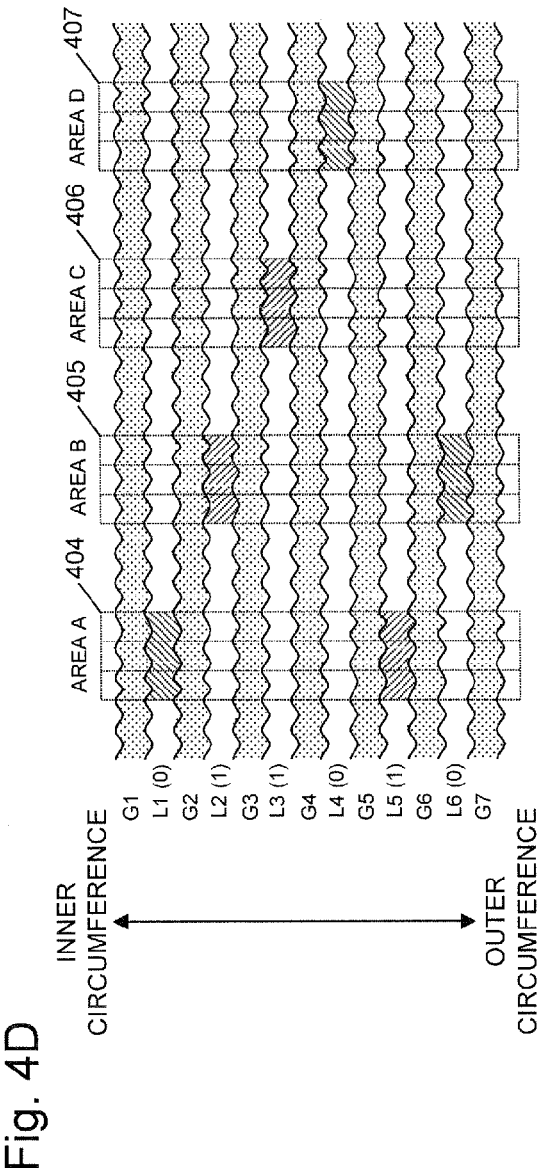

FIG. 4D is a drawing illustrating an example of address information wobbles 310 of six land tracks which are arranged in parallel in the radial direction. FIG. 4D focuses on an address information wobble 301 in arbitrary one ADIP unit 303 in one ADIP 104, and shows such address information wobbles 301 are arranged in the radial direction (from the inner circumference to the outer circumference of the disc). From FIG. 4D, relationship of adjacent tracks can be seen. In FIG. 4D, the reference sign "G" indicates the groove, and the reference sign "L" indicates the land.

Because the address information wobbles 310 are formed based on address information as described above, the address information is different between the adjacent ADIPs in the radial direction of the optical disc.

The address information wobbles 310 are formed based on address information which is to be assigned to the land.

As shown in FIG. 4D, the ADIP 104 includes, on the areas of the address information wobble 310, a plurality of areas as areas (hereinafter also referred to as "address recording area") for being disposed wobble patterns base on the address information. More specifically, four areas of an area A (404), an area B (405), an area C (406), and an area D (407) are disposed as the address recording areas.

In addition, on each ADIP 104, one area is set (selected) in advance from among the area A to the area D as an area on which the address information with respect to the ADIP is actually disposed. Hereinafter, the address recording area being set (selected) as an area on which address information is actually disposed is referred to as a "valid address recording area". Namely, in one ADIP 104, the address information with respect to the one ADIP is not disposed on other address recording areas different from the set (selected) address recording area. That is, in one ADIP 104, the same type (A to D) of the address recording areas are used as the valid address recording area. For example, on a certain ADIP, when the area A is set (selected) as a valid address recording area, the address information for that ADIP is not disposed on the areas B to D.

Exemplary states that the address information wobbles 310 have address information in this embodiment are described below.

In the example shown in FIG. 4D, focusing on the land tracks, the lands L1 to L6 are arranged in an order, from the inner circumference. In the land L1, the valid address recording area is the area A (404) which records (stores) address information "0". In the land L2, the valid address recording area is the area B (405) which records address information "1". In the land L3, the valid address recording area is the area C (406) which records address information "1". In the land L4, the valid address recording area is the area D (407) which records address information "0". In the land L5, the valid address recording area is the area A (404) which records address information "1". In the land L6, the valid address recording area is the area B (405) which records address information "0". In this manner, the valid address recording area is selected so that the types of the valid address recording areas are different between the lands arranged adjacently in the radial direction.

In the land L1, the pattern 402 of the address information "0" is disposed on the area A (404). In order to achieve this, a waveform of $+\cos(1.25\omega t)$ of one wobble period, a waveform of $-\sin(\omega t)$ of one wobble period, and a waveform of $+\cos(0.75\omega t)$ of one wobble period are disposed on grooves G1 and G2 on both sides of the land on which the address information "0" is disposed.

In the land L5, the pattern 403 of the address information "1" is disposed on the area A (404). In this case, a waveform of $+\cos(0.75\omega t)$ of one wobble period, a waveform of $+\sin(\omega t)$ of one wobble period, and a waveform of $+\cos(1.25\omega t)$ of one wobble period are disposed on grooves G5 and G6 on both sides of the land on which the address information "1" is disposed In the address information wobble 310, the base wobbles 302 are disposed on a part on which address information is not disposed.

In comparison of the shape of the pattern 402 of the address information "0" and the pattern 403 of the address information "1" with the shape of the base wobble 302, the waveforms of the second wobbles (namely, information wobbles) 402a and 403a having distinctive shapes in the address information patters 402 and 403 are used. The information wobble 402a of the address information "0" has a phase difference of −90 degrees for the base wobble 302, and the information wobble 403a of the address information "1" has a phase difference of +90 degrees for the base wobble 302.

On the other hand, the waveforms of the first and third wobble periods of the pattern 402 of the address information "0" and the pattern 403 of the address information "1" have a waveform of a cosign function with a period of 1.25 or 0.75 times the base wobble. This is because the first and third wobble periods are made connected to the second wobble period with gradual phase shift. Further, the waveforms of the first and third wobble periods in the pattern 402 of the address information "0" and in the pattern 403 of the address information "1" are formed so that they have phase differences equal to or less than 90 degrees with respect to the waveform of the base wobble 302.

Returning to FIG. 4D, the ADIP 104 of a certain land Ln is now focused on. For the ADIP 104 of the land Ln+1 adjacent to the land Ln on the outer circumference side, an area next to the area which is set for the land Ln is set as a valid address recording area on which address information for the land Ln+1 is disposed. Here, the order of area is area A→area B→area C→area D→area A→ .... Therefore, when the area A is set as a valid address recording area in the ADIP 104 of the land Ln, the area B is set as a valid address recording area in the ADIP 104 of the land Ln+1. As shown in the example of FIG. 4D, for the lands L1 to L6, the valid address recording areas are set in the order of area A→area B→area C→area D→area A→ ....

In other words, in the land Ln−1 of the ADIP 104 adjacent to the land Ln from the inner circumferential side, an area previous to an area which is set as an active address information area of the land Ln is set as an active address information area of the land Ln−1. For example, if the area A is set in the land Ln of the ADIP 104, the area D is set in the land Ln−1 of the ADIP 104.

As described above, four areas (areas A to D) are provided as areas (address recording areas) on which wobbles having address information can be disposed. In addition, among these areas, the valid address recording area on which address information is actually disposed is shifted for every land track. For this reason, the types of valid address recording areas in the four land tracks arranged side by side in the radial direction are different from each other.

Such an arrangement of the address recording areas (address information) allow in any areas of the land, an area on both side of which wobbles having address information (the pattern 402 of the address information "0", the pattern 403 of the address information "1") are formed not to exist on an area other than an area that actually has address information.

In other words, the area selected as an area (active address information area) on which address information is actually disposed is shifted sequentially in the circumferential direction, for lands adjacent to in the radial direction. Therefore, the waveform of the wobble providing address information on one land does not affect a wobble providing address information on another land neighboring the one land in the radial direction. Thus, the shape of the wobble of the groove adjacent to the land on which address information is disposed on the inner circumferential side of the land and the shape of the wobble of the groove adjacent to the land on the outer circumferential side can be in-phase, so that variation of the groove width can be suppressed.

In the optical disc medium according to the present embodiment, four areas (areas A to D) on which address information can be recorded are provided, and an area to be selected from the four areas as an valid address recording area is shifted by one for every track. However, the number of the areas that can record address information is not limited to three, but the number can be three or more. If the number of the areas that can record address information is three or more, the waveform of the wobble providing address information on one land does not affect wobbles providing address information on the other lands neighboring the one land in the radial direction, achieving the above-mentioned effects.

As described above, the optical disc 101 according to the present embodiment is an optical disc medium in which information can be recorded on a land and groove thereof. In the optical disc 101, a predetermined number of ADIPs 104 are provided in a circumferential direction of the optical disc 101, where the ADIPs 104 are address information units which record (or store) address information of the land or groove. Each ADIP 104 includes three or more address recording areas (for example, the area A (404), the area B (405), the area C (406), the area D (407)) on which address information can be recorded, and the address information is recorded on one area (valid address recording area) selected from among the three or more address storing areas. The one area (valid address recording area) selected from among the three or more address storing areas for recording the address information is different among three address information units arranged side by side in the radial direction.

According to the configuration as above, a wobble formed on one track for recoding address information does not affect address information on another track adjacent in the radial direction. Therefore, the shape of the waveform of the wobble on the one track can be determined according only to the address information on the one track without considering address information of the adjacent tracks, and thus, variation of the track width can be suppressed. Accordingly, high recording density can be achieved, reliability of detection of address information can be ensured, and influence on recording of user data can be reduced.

In addition, the optical disc 101 according to the present embodiment is an optical disc medium in which information can be recorded on a land and groove thereof. In the optical disc 101, a predetermined number of ADIPs 104 are provided in a circumferential direction of the optical disc medium, where the ADIPs 104 are address information units which record address information of the land or groove. Wobbles are formed on the land or groove. The wobbles include a base wobble 302 and information wobbles 402a and 403a indicating predetermined logical values. In the ADIP 104, the address information is recorded with the information wobbles 402a and 403a in the wobbles on the land or groove. The information wobbles 402a and 403a are formed to have waveforms with phase differences of −90 to +90 degrees with respect to the waveform of the base wobble.

The phase difference of the waveform between the information wobble and the base wobble from −90 to +90 degrees allows the phase difference of the waveforms on the both sides of the land or groove on which wobble is formed to be suppressed within 90 degrees at most. Accordingly, the variation of the track width can be suppressed, and thus, high recording density can be achieved, reliability of detection of address information can be ensured, and influence on recording of user data can be reduced.

1-2. Variation of Land Track Width

With reference to FIGS. 5A to 5C, variation of the land track width for phases of the groove on both sides of the land is described below. FIGS. 5A to 5C are drawings illustrating a form of wobbles, in three wobble periods, of the track sandwiched by the grooves. FIG. 5A is a drawing illustrating two grooves G1 and G2 having the same phase of wobbles and a land L between the grooves G1 and G2. FIG. 5B is a drawing illustrating two grooves G1 and G2 having the opposite phase of wobbles (phase difference is 180 degrees) and a land L between the grooves G1 and G2. FIG. 5C is a drawing illustrating the two grooves G1 and G2 having phase difference in wobbles by 90 degrees and a land L between the grooves G1 and G2.

In FIG. 5A, the phases of the grooves G1 and G2 on the both sides of the land L are in-phase and the inner groove G1 and the outer groove G2 vary synchronized with each other. Thus, the variation Δw of the width of the track of the land L is zero as shown in the following equation, namely, the width of the track is constant.

$$\Delta w = a \cdot \cos(\omega t) - a \cdot \cos(\omega t) = 0$$

In FIG. 5B, at a position where the inner groove G1 has a maximum displacement in the inward direction, the outer groove G2 has a maximum displacement in the outward direction, and therefore, the land L has the maximum track width at the position. Contrary, at a position where the inner groove G1 has a maximum displacement in the outward direction, the outer groove G2 has a maximum displacement in the inward direction, and therefore, the land L has the minimum track width at the position. Accordingly, the variation in difference Δw of the track width changes depending on the position in the circumferential direction, as shown in the following equation.

$$\Delta w = a \cdot \cos(\omega t) - (-a \cdot \cos(\omega t)) = 2a \cdot \cos(\omega t)$$

In FIG. 5C, since the phase difference is 90 degrees, the variation in difference of the track width can be suppressed to be smaller than that of the case of the phase difference of 180 degrees. Specifically, the variation in difference Δw of the land track width becomes 0.7 times that of the case (FIG. 5B) of the phase difference of 180 degrees, as shown in the following equation.

$$\Delta w = a \cdot \cos(\omega t) - a \cdot \sin(\omega t) = \sqrt{2} a \cdot \sin(\omega t - \pi/4)$$

As described above, according to the optical disc of the present embodiment, since the phase difference of the grooves on the both sides of the land is set to 90 degrees or less, the maximum variation of the track width of the land can be decreased by approximately 70% of the case of the optical disc having the phase difference of the adjacent wobbles which is 90 degrees.

1-3. Assignment of Address Information Area in ADIP

Figure 6:
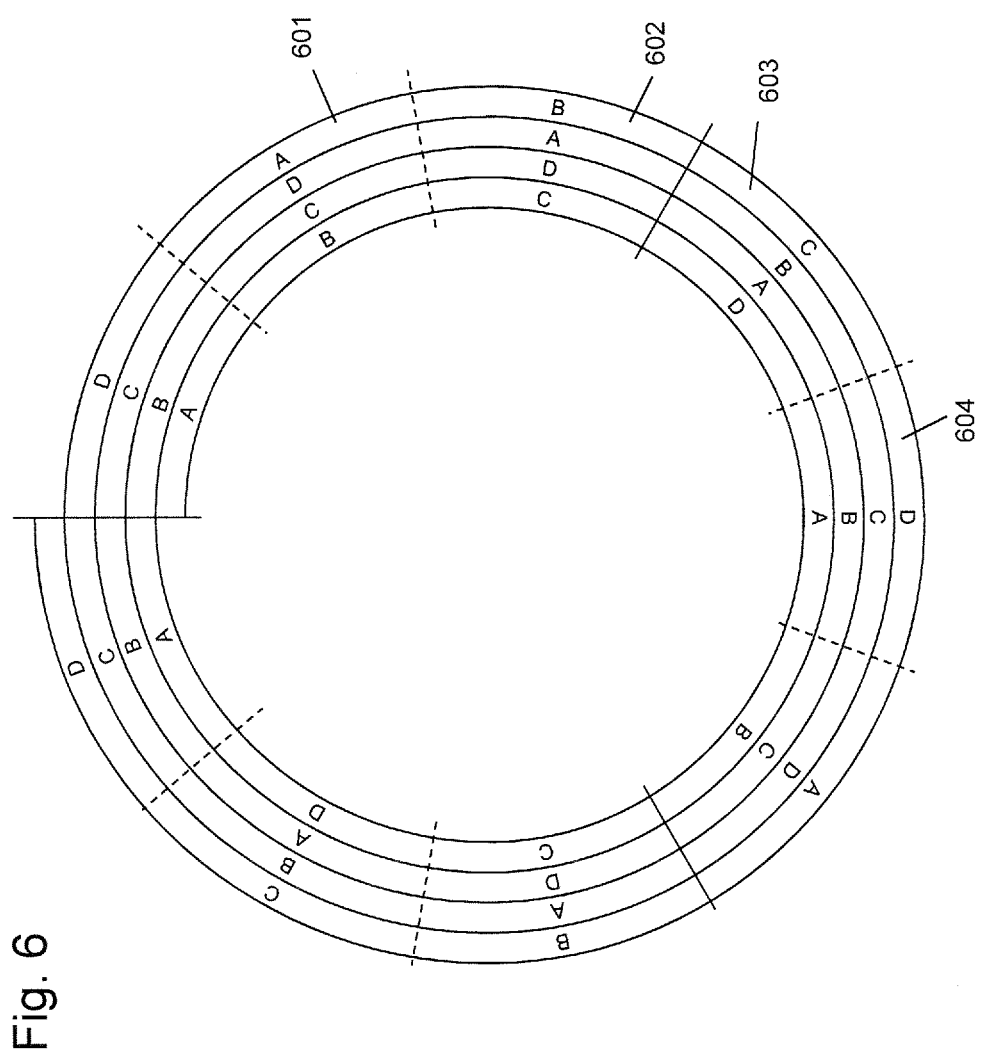
FIG. 6 is a drawing for describing arrangement of ADIPs according to the embodiment.

FIG. 6 shows a drawing for describing assignment of the selected areas A to D on each ADIP in the optical disc of the present embodiment. As shown in FIG. 6, an ADIP 601 in which the area A is selected as an area on which address information is disposed, an ADIP 602 in which the area B is selected, an ADIP 603 in which the area C is selected, and an ADIP 604 in which the area D is selected are arranged in this order in the circumferential direction.

In the optical disc of the present embodiment, the area (A to D) to be selected as an area on which address information is disposed is shifted in order in accordance with the arrangement order of the ADIPs 104. This arrangement allows easy anticipation of the area selected on the subsequent ADIP 104 on the basis of the area on the preceding ADIP 104 selected as an area on which address information is disposed.

In addition, one track (one circuit) is divided in the circumferential direction at equal angle intervals into a plurality (for example, nine) of ADIPs, and the number of the ADIPs per one circuit is set to an integral multiple of the number of selectable areas (for example, four) plus one (for example, set to nine ADIPs). With this arrangement, the area selected as an area on which address information is disposed is shifted by one area for every circuit, for an ADIP arranged in the region having the same central angle on the next or previous track.

That is, the area is shifted by one for every track. This arrangement is achieved by setting the number of the ADIPs per one circuit to an integral multiple of the number of the selectable areas (for example, 4) plus one. For example, when the number of the areas selectable as an area on which address information is disposed is set to three, the number of the ADIPs per one circuit can be set to ten so that the same effects can be achieved as in the case that the number of the selectable areas is four.

Further, in order to achieve a configuration that the selected area is different among the lands on three tracks arranged side by side in the radial direction, the number of the ADIPs per one circuit and the number of the selectable areas may be set to be coprime to each other.

As described above, according to the optical disc 101 of the present embodiment, in the ADIPs 104 which are address information units spirally arranged, the number (for example 9) of the ADIPs 104 included in one circuit (one track) and the number (for example, 4) of the areas (areas A to D) of one ADIP 104 on which address information is disposed are coprime to each other.

In the optical disc of the present embodiment, the wobbles having address information have phase differences of 90 degrees with respect to the base wobble 302. However, the phase difference may be equal to or less than 90 degrees. When the phase difference are equal to or less than 90 degrees, the smaller the phase difference is, the smaller the variation of the land track width is, and therefore, greater effects can be expected. In this case, however, detection performance of the address information may deteriorate, and to avoid this, for example, the phase difference may be set to certain degree that can ensure reliability of the address information.

According to the configuration of the optical disc medium of the present embodiment, the ADIPs 104 are arranged in a radial direction and spirally from the inner circumferential side to the outer circumferential side with the same central angle. However, a predetermined zone may be set in each of predetermined ranges in a radial direction, and the same configuration as that of the optical disc of the present embodiment may be applied to the predetermined zone in each range in a radial direction. This can also achieve the same effects.

2. Optical Disc Device

Figure 7:
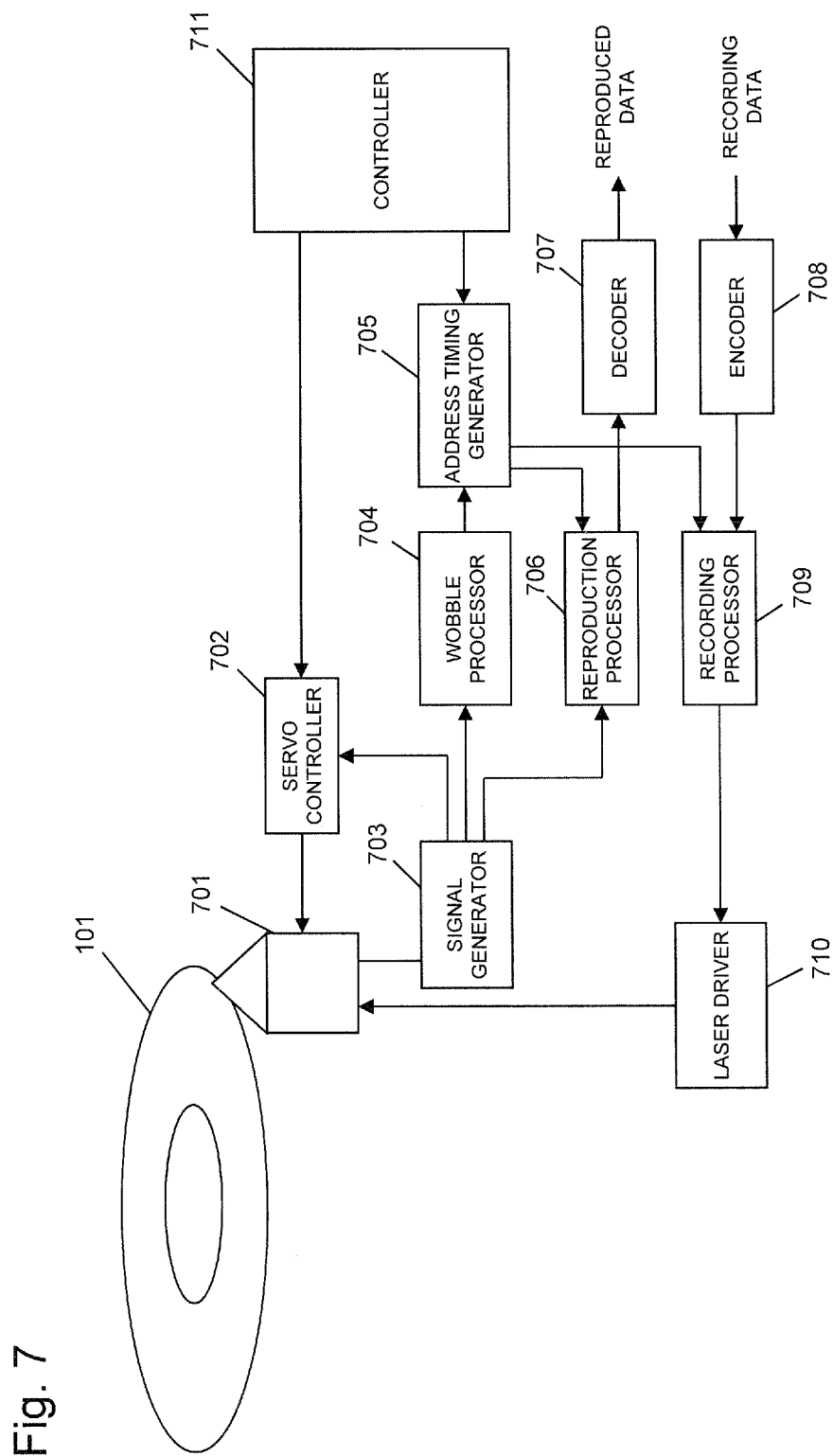
FIG. 7 is a block diagram of an optical disc device according to an embodiment.

An optical disc device that records information on and reproduces information from the optical disc 101 according to the present embodiment is described below. FIG. 7 is a block diagram of the optical disc device according to the present embodiment.

The optical disc device includes an optical head 701, a servo controller 702, a signal generator 703, a wobble processor 704, an address timing generator 705, a reproduction processor 706, a decoder 707, and a controller 711. The optical disc device further includes an encoder 708, a recording processor 709, and a laser driver 710.

The optical disc 101 is inserted into the optical disc device. The optical head 701 irradiates a light beam on the optical disc 101. The light beam is reflected on the optical disc 101, and the reflected light is converted by a photo detector (not shown) into an electrical signal having a voltage level representing information on the reflected light amount. The photo detector is included in the optical head 701. The photo detector is composed of four separate photo detectors which are arranged in four regions divided in the track groove direction (tangential direction) and the radial direction (radial direction).

Based on electrical signals output from the separate photo detectors, the signal generator 703 generates a focus error signal, a tracking error signal, a wobble signal, and an addition signal.

The addition signal is the sum of all the signals from the four separate photo detectors, and represents the reflected light amount itself from the optical disc. The focus error signal is a signal which is, for example, detected by the astigmatic method. The focus error signal is obtained as follows. Specifically, in each of pairs of the separate photo detectors arranged in the diagonal directions, signals from the separate photo detectors are summed. Then the subtraction is performed between the summed signal of one pair and the summed signal of the other pair to obtain the focus error signal.

The tracking error signal and the wobble signal are signals detected by the push-pull method. The tracking error signal and the wobble signal are obtained as follows. Specifically, in each of pairs of the separate photo detectors arranged in the tangential direction, the two signals from the separate photo detectors are summed. Then subtracting is performed between the summed signal of one pair and the summed signal of the other pair to obtain each of the tracking error signal and the wobble signal.

The tracking error signal is generated by extracting a frequency component in a range from 0 Hz to several tens of kilohertz from a push-pull signal. The wobble signal is generated by extracting a signal component in a range from several tens of kilohertz to several megahertz from the push-pull signal.

The servo controller 702 moves upwardly and downwardly an objective lens in the optical head 701 so that the focus error signal becomes zero, to collect a light spot on a recording surface. In addition, the servo controller 702 drives the objective lens in the radial direction so that the tracking error signal becomes zero, to cause the light spot to track the land or groove.

Whether the tracking is performed on the land or on the groove is determined in accordance with whether to drive the light spot to the outer circumference or the inner circumference based on the tracking error. This driving direction is determined according to instructions from the controller 711.

The signal generator 703 is a signal generating unit. The wobble processor 704 processes a wobble signal generated by the signal processor 703. The wobble processor 704 generates a wobble clock by multiplying a reproduction signal on an area of base wobbles 302 in the wobble signal, detects ADIP synchronization, and reproduce address information.

The address timing generator 705 generates timing for reproduction processing from various signals generated by the wobble processor 704 to output the timing to the reproduction processor 706. Similarly, the address timing generator 705 generates timing for recording processing from various signals generated by the wobble processor 704 to output the timing to the recording processor 709. At this time, the address timing generator 705 uses a target address which is instructed from the controller 711.

For the reproduction of the user data, each of components operates as follows. First, the reproduction processor 706 extracts binary data from the addition signal generated by the signal generator 703, in accordance with the timing of a reproduction target address generated by the address timing generator 705. Then, the decoder 707 decodes the binary data and performs error correction on the decoded data, and then output the error-corrected decoded data as reproduction data.

For the recording of the user data, each component operates as follows. First, the encoder 708 receives recoding data and adds error-correction code to the recording data, and then encodes the recording data to binary data. The recording processor 709 sends the laser driver 710 an instruction for recording power of light emission, according to the timing of the recording target address generated by the address timing generator 705.

2-1. Wobble Processor

Figure 8:
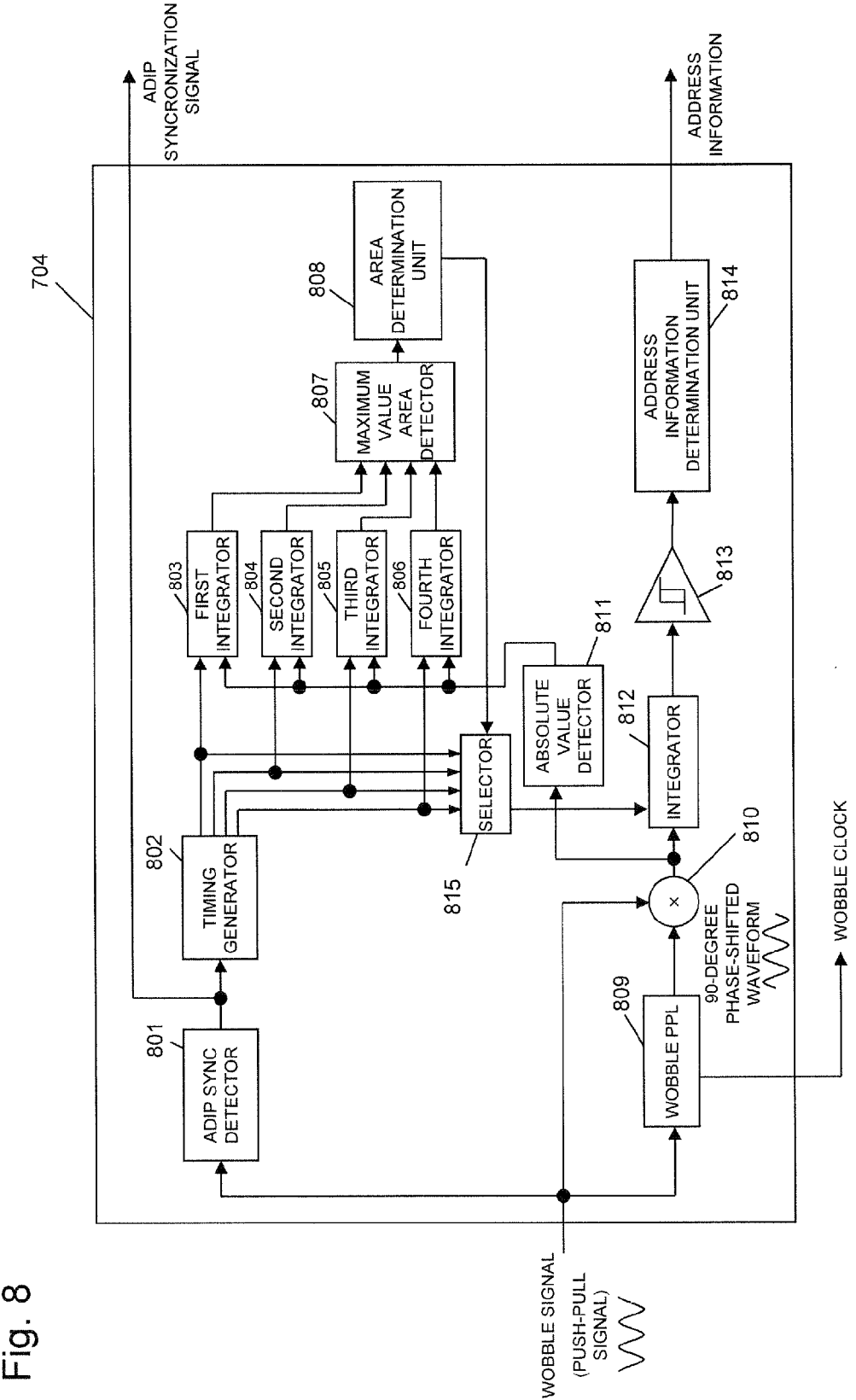
FIG. 8 is a drawing for describing configuration and operation of a wobble processor according to the embodiment.

With reference to FIG. 8, the wobble processor 704 of the optical disc device according to the present embodiment is described in detail below.

The wobble processor 704 includes an ADIP synchronization detector 801, a timing generator 802, first to fourth integrators 803 to 806, a maximum value area detector 807, and an area determination unit 808. The wobble processor 704 further includes a wobble PLL 809, a multiplier 810, an absolute value detector 811, an integrator 812, a comparator 813, and an address information determination unit 814.

A wobble signal is input from the signal generator 703 to the wobble processor 704. The wobble PLL 809 multiplies a reproduction signal from the base wobble 302 to generate a wobble clock. Simultaneously, the wobble PLL 809 generates a 90-degree phase-shifted waveform which has the same frequency as the base wobble 302 and has a phase shifted by +90 degrees from the phase of the base wobble 32. Namely, the wobble PLL 809 is an example of a phase-shifted waveform generating unit.

In this embodiment, the 90-degree phase-shifted waveform is a sine waveform, but it may be other waveforms. For example, it may be a rectangular waveform, triangular waveform, and so on, and these waveforms can achieve the same functions as the sine waveform. Such a waveform may be selected for the simplicity of circuit design. The multiplier 810 multiplies the 90-degree phase-shifted signal generated by the wobble PLL 809 by the wobble signal to output the signal generated by the multiplication. The absolute value detector 811 outputs the absolute value of the output from the multiplier 810. The absolute value detector 811 outputs 0 for the wobble signal of the base pattern, and outputs a value other than 0 for the wobble signal of the pattern of the address information "0" or the address information "1".

On the other hand, the ADIP synchronization detector 801 searches a signal on the synchronization area 105 in the optical disc 101 from the wobble signal to output an ADIP synchronization signal synchronized with the ADIP.

The timing generator 802 counts the wobble clock generated by the wobble PLL 809 up to a certain number to generates a timing signal indicating each of the areas A to D. These timing signals are output for every address information wobbles 310 in the ADIP 104.

The first to fourth integrators 803 to 806 are reset at the boundary of the ADIPs 104, and integrate the output signal from the absolute value detector 811 in synchronization with the timings of the area A to the area D generated by the timing generator 802 to output the results, respectively. Hence the first to fourth integrators 803 to 806 integrate the signals from the areas A to D to output the results, respectively.

The maximum value area detector 807 is an example of an address information searching unit. The maximum value area detector 807 detects which integrator among the first to fourth integrators 803 to 806 outputs the maximum value, and outputs the detected result. The process of detecting the maximum value area is performed based on the results of the integration processes over the whole of the ADIP, and thus the searching of the area on which address information is recorded can be performed with high reliability.

The area determination unit 808 is an example of an area determination unit. The area determination unit 808 determines one area from among the areas A to D, as an area on which the address information is disposed, at a boundary of the subsequent ADIPs, based on the output from the maximum value area detector 807. At this time, the area determination unit 808 determines the area of the subsequent ADIP, based on the output from the maximum value area detector 807 on the preceding ADIP 104 at the ADIP boundary timing. Specifically, when the output from the maximum value area detector 807 on the preceding ADIP 104 at the ADIP boundary timing indicates the area A, the area B is anticipated for the subsequent ADIP, and therefore, the area determination unit 808 selects the area B. Similarly, when the area B is determined for the preceding ADIP, the area C is selected for the subsequent ADIP. Similarly, when the area C is determined for the preceding ADIP, the area D is selected for the subsequent ADIP. Similarly, when the area D is determined for the preceding ADIP, the area A is selected for the subsequent ADIP.

The selector 815 selects a timing signal of the area selected by the area determination unit 808 to output it. The integrator 812 integrates the output signal from the multiplier 810 to output the result in accordance the timing signal selected by the selector 815. The operation by the configuration of the multiplier 810 and the integrator 812 is generally known as means for phase detection. That is, the configuration of the multiplier 810 and the integrator 812 is an example of a phase detection unit.

The comparator 813 binalizes the output from the integrator 812 at the end of the address information wobble 310. The address information determination unit 814 is an example of an address information searching unit. The address information determination unit 814 determines address information based on the output result of the comparator 813 for all of the address information wobbles 310 of the ADIP 104, and outputs it as address information.

Figure 9:
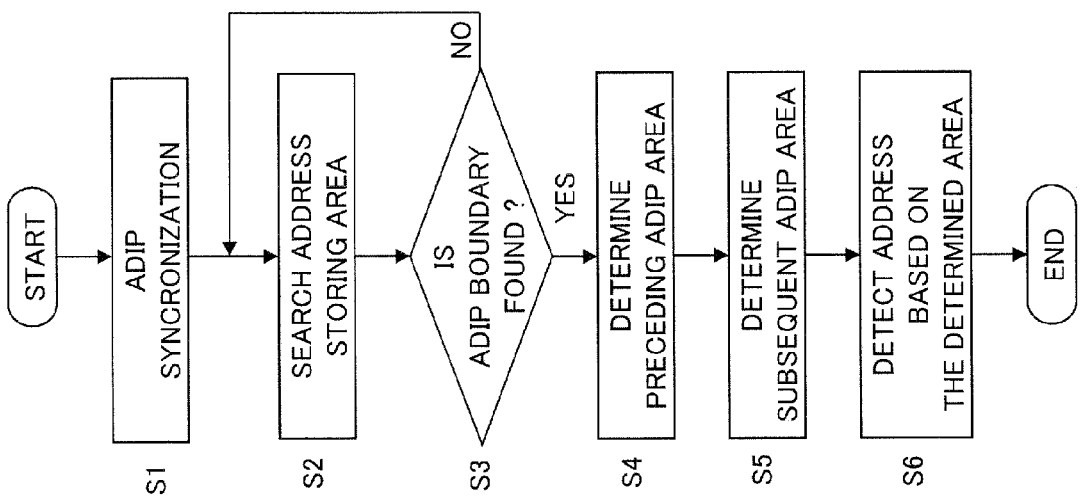
FIG. 9 is a flowchart for describing operation of address reproduction by the optical disc device according to the embodiment.

FIG. 9 is a flowchart of operation of reproducing the address information in the optical disc device according to the present embodiment. With reference to the flowchart in FIG. 9, the operation of the address information reproduction of the optical disc device of the present embodiment is described below. When the reproduction of the address information is started, the ADIP synchronization detector 801 performs ADIP synchronization for determining a position of the ADIP 104 (S1).

Once the ADIP synchronization is established, it becomes possible to generate the timing of the areas A to areas B. Then, the timing generator 802, the first to fourth integrators 803 to 806, and the maximum value area detector 807 search for the address recording areas (S2). This process (S2) is performed until reaching the ADIP boundary (S3). When reaching the ADIP boundary, the maximum value area detector 807 determines the area of the preceding ADIP (S4).

Then, the area determination unit 808 determines the area of the subsequent ADIP (S5). The selector 815 selects the timing of the determined area. Then the integrator 812, the comparator 813, and the address information determination unit 814 performs address detection in the determined area (either one of areas A to D).

Other Embodiments

As described above, the first embodiment is described as examples of the art disclosed in the present application. However, the art in the present disclosure is not limited thereto, and is also applicable to various embodiments to which modifications, substitutions, additions, or omissions, etc. is suitably applied.

For example, in the above example, the pattern shown in FIG. 4B is the pattern of the address information "0", and the pattern shown in FIG. 4C is the pattern of the address information "1", however, the pattern settings may be vice versa. That is, the pattern shown in FIG. 4B may be the pattern of the address information "1", and the pattern shown in FIG. 4C may be the pattern of the address information "0".

In addition, as shown in the address information patters 402 and 403 in FIGS. 4B and 4C, the number of the information wobble 402a and 403a ($\pm\sin(\omega t)$) is one, however, it may be plural (two or more) (for example, six), in consideration of the viewpoint of the reliability. For example, the pattern of the address information "0" may be formed by a combination of a waveform of $+\cos(1.25\omega t)$ of one period, a waveform of $-\sin(\omega t)$ of 6 periods, and a waveform of $-\cos(0.75\omega t)$ of one period. Similarly, the pattern of the address information "1" may be formed by a combination of a waveform of $+\cos(0.75\omega t)$ of one period, a waveform of $+\sin(\omega t)$ of 6 periods, and a waveform of $-\cos(1.25\omega t)$ of one period.

In addition, each component of the optical disc device described in the embodiment above may be realized as a dedicated electronic circuit (hardware, ASIC, DSP, or the like). Alternatively, CPU, MPU, FPGA, or the like may be programmable or reconfigurable to realize the functions of the components of the optical disc device.

As described above, the optical disc device according to the present embodiment includes an address information searching unit that searches an area on which address information is formed, an area determination unit that determines an area on which the address information is formed based on the result of the address information searching unit, and an address information detection unit that detects an address from the area determined by the area determination unit.

In addition, the optical disc device according to the present embodiment includes a signal generating unit that generates a signal corresponding to a wobble of a track, a 90-degree phase-shifted waveform generating unit that generates a signal having a phase difference of 90 degrees with respect to the base wobble, from the signal generated by the signal generating unit, a phase detection unit that detects a phase by using the signal generated by the 90-degree phase-shifted waveform generating unit, and an address information detection unit that detects an address based on the detection results of the phase detection unit.

As described above, embodiments are described as examples of the art according to the present disclosure. For that, the accompanying drawings and the detailed descriptions are provided.

Accordingly, the components described in the accompanying drawings and the detailed description for exemplifying the art as described above may include not only components which are necessary to solve the problem, but also components which are unnecessary to solve the problem. Therefore, it should not immediately be construed that the unnecessary components are necessary even though such unnecessary components are described in the drawings or the description.

In addition, the embodiments as described above are to exemplify the art in the present disclosure, and therefore, the embodiments can be applied various kinds of modifications, substitutions, additions, omissions, and so on, provided that they fall within the scope of the claims or equivalents thereof.

INDUSTRIAL APPLICABILITY

The present disclosure is applicable to a recording medium that records physical addresses on a groove of track, and to a device for recording and/or reproducing data on such a recording medium. More specifically, the present disclosure is applicable to an optical disc medium and an optical tape, and to a device for recording and/or reproducing data on the optical disc or tape, and the like.

What is claimed is:

1. An optical disc medium comprising a land and a groove at which information can be recorded, wherein
    a predetermined number of address information units which record address information of the land or groove are provided in a circumferential direction of the optical disc medium,
    the address information unit of the land includes three or more address recording areas capable of recording address information, the address information is recorded on one area selected from among the three or more address recording areas,
    the one area to be selected from among the three or more address recording areas for recording the address information of the land is different among three address information units adjacently arranged in a radial direction,
    wobbles are formed on the land and the groove,
    the wobbles include a base wobble and an information wobble indicating a predetermined logical value of 0 or 1,
    the address information is recorded with the logical value of the information wobble,
    the logical value 0 of the information wobble is represented by a waveform having a phase different from a phase of the base wobble by about −90 degree, and the logical value 1 of the information wobble is represented by a waveform having a phase different from a phase of the base wobble by about +90 degree,
    the wobble of the groove adjacent to a land on the inner circumference side has the same waveform as the wobble of the groove adjacent to the land on the outer circumference side, and
    variation of track width of the land or groove is suppressed to a predetermined range.

2. The optical disc medium according to claim 1, wherein the predetermined range is 70% of a width of a track having a waveform with a phase that is different from a phase of the base wobble by 180 degrees.

3. The optical disc medium according to claim 1, wherein the number of the address information units provided in the circumferential direction and the number of the address recording areas are coprime to each other.

4. An optical disc device that reproduces information from the optical disc medium according to claim 1, comprising:
    a signal generator configured to generate a signal in accordance with the wobbles formed on the land or groove;
    a phase-shifted waveform generator configured to generate a signal having a phase difference of 90 degrees with respect to the base wobble, from the signal generated by the signal generator;
    a phase detector configured to perform phase detection by using the signal generated by the signal generator and the signal generated by the phase-shifted waveform generator to generate a signal;
    an area determining unit configured to determine one area on which address information is recorded from the three or more address recording areas, according to an absolute value of a signal generated by the phase detector; and
    an address detector configured to detect an address from the area determined by the area determining unit based on a detection result of the phase detector.

5. A method of reproducing information from the optical disc medium according to claim 1, comprising:
    generating a wobble signal in accordance with the wobbles formed on the land or groove;
    generating a signal having a phase difference of 90 degrees with respect to the base wobble, from the wobble signal;
    performing phase detection by using the wobble signal and the signal having the phase difference to generate a signal;
    determining one area on which address information is recorded from the three or more address recording areas, according to an absolute value of the signal generated by the phase detection; and
    detecting an address from the area determined by the area determining unit based on a result of the phase detection.

* * * * *